United States Patent [19]

Mattson

[11] 4,077,393
[45] Mar. 7, 1978

[54] SOLAR ENERGY HEAT COLLECTOR

[76] Inventor: John P. Mattson, 123 Lake Shore Dr., Duxbury, Mass. 02332

[21] Appl. No.: 649,032

[22] Filed: Jan. 14, 1976

Related U.S. Application Data

[63] Continuation-in-part of Ser. No. 621,759, Oct. 14, 1975, abandoned.

[51] Int. Cl.² ............................................. F24J 3/02
[52] U.S. Cl. .................................... 126/271; 126/270
[58] Field of Search ............... 126/270, 271; 237/1 A; 350/288, 289, 293, 299

[56] References Cited

U.S. PATENT DOCUMENTS

| 921,976 | 5/1909 | Glass | 126/271 |
|---|---|---|---|
| 2,625,930 | 1/1953 | Harris | 126/270 |
| 3,889,742 | 6/1975 | Rush et al. | 126/271 |
| 3,986,491 | 10/1976 | O'Hanlon | 126/271 |

*Primary Examiner*—Kenneth W. Sprague
*Assistant Examiner*—James C. Yeung
*Attorney, Agent, or Firm*—Edward A. Gordon

[57] ABSTRACT

An apparatus for collecting radiant solar energy to provide solar heating which may be used singly or in multiples as modular units. The apparatus is constructed as a self-contained unit having an insulated base, an energy receiving surface positioned adjacent the insulated base, and a heat exchange fluid conduit for circulating a heat exchange fluid in contact with the energy receiving surface. Other conduits are provided to introduce a heat exchange fluid and to receive or collect the fluid after it has been in contact with the energy receiving surface. The top or cover of the collector module is positioned in spaced relationship adjacent the energy receiving surface. The cover is transparent to solar energy and is provided with a plurality of spaced raised structures having surfaces angularly disposed to transmit radiant solar energy to the energy receiving surface. Side walls provide a self-contained unit and permit mounting of the unit on a surface.

7 Claims, 8 Drawing Figures

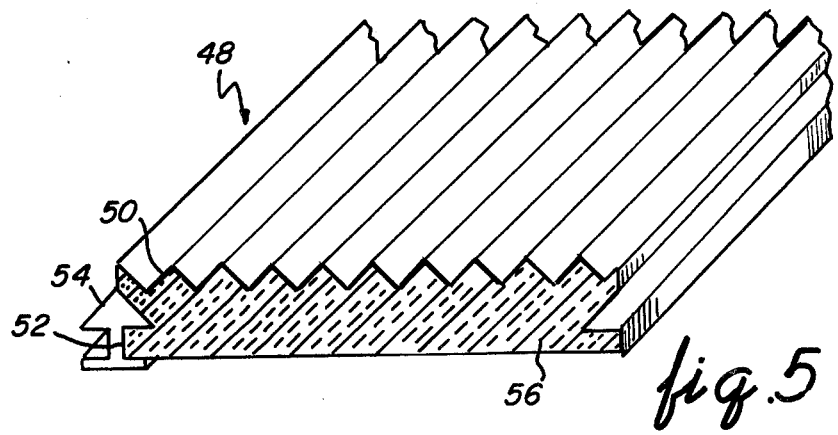
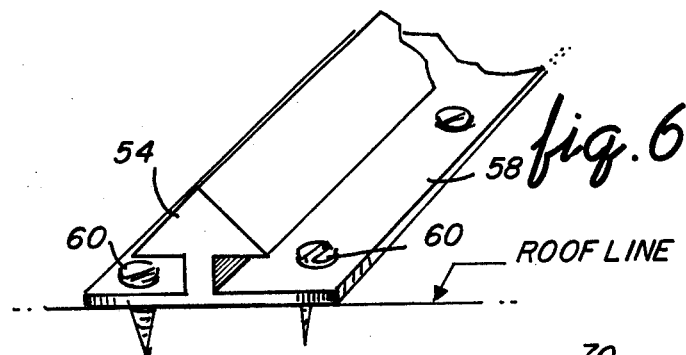
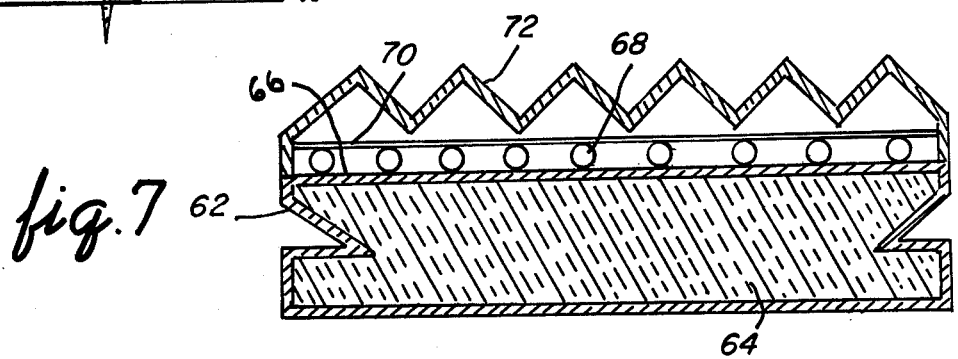
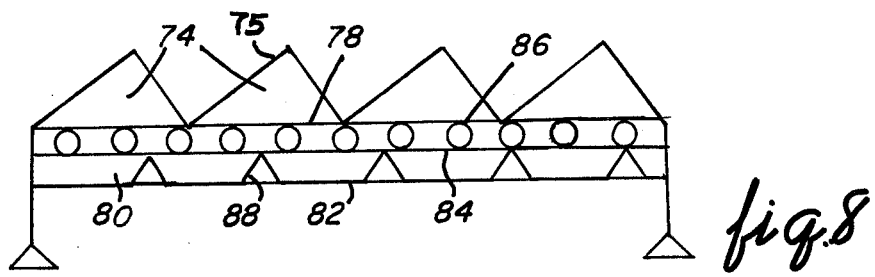

SOLAR ENERGY HEAT COLLECTOR

This application is a continuation in part of my copending application Ser. No. 621,759 filed Oct. 14, 1975, now abandoned.

BACKGROUND OF THE INVENTION

1. Field of the Invention

This invention relates to an apparatus for collecting radiant solar energy and more particularly to a solar energy heater which can be attached to a surface without regard to direction or angle of the surface upon which the collector is positioned.

2. Description of the Prior Art

There have been numerous systems proposed for the utilization of solar energy which generally comprises a collector unit which directs solar energy on an energy receiving means which may be an evaporator unit or a conduit for a heat exchange medium. Unlike conventional fuel burning systems, such solar devices provide a non-polluting source of usable energy. In many prior art systems large black aluminum collectors adsorb the sun's energy beneath rigid sheets of plastic. In these systems the flat sandwich-like assembly is positioned to be aimed due south and tilted at an angle of 45 degrees. While such flat solar energy collector assemblies can be installed on an existing building with a flat roof surface, it is not readily adaptable to existing structures having inclined roofs and are particularly not suitable for inclined roofs which run in a generally east-west direction, for example, since they are then unable to utilize the total solar energy available. In such instances installation may require the giving up of land around the building. For the homeowner the giving up of land may be too high a price to pay for lower heating costs.

In other prior systems one or more reflector units are mounted on a framework which changes its inclination in dependence upon the elevation of the sun, thereby assuring that the reflected solar energy will always be directed at the energy receiving means. These previous systems impose severe restrictions on the size of the reflector assembly since it must be capable of swinging movement in a vertical plane.

In other prior systems frames have carried a plurality of individually inclinable reflector units of parabolic cross-sections, with each reflector unit having its own energy receiving means located at the focus of the parabola. In still other prior systems there is provided a single energy receiving means which receives reflected solar energy from a plurality of individually inclinable reflector units.

The foregoing prior art, while providing solar energy collectors, do not provide a solar energy collector which is readily adaptable to a surface which points substantially in any direction and at optimum angles to horizontal or level while still providing effective collection of radiant solar energy.

It is therefore, the desire of this invention to provide an apparatus for collecting radiant solar energy which is readily adaptable to a surface which points in substantially any direction and inclined at optimum angles to horizontal or level while still providing effective collection of radiant energy.

It is also desirable to provide a radiant solar energy collector which provides structural rigidity and lightweight construction.

It is also desirable to provide a radiant solar energy collector capable of simple modular construction, stylish in appearance, which can be installed on existing roofs regardless of location or pitch.

SUMMARY OF THE INVENTION

This invention relates to an apparatus for collecting radiant solar energy and more particularly to provide modular units which may be used singly or in multiples.

In accordance with the present invention the apparatus is constructed as a self-contained unit having an insulated base, an energy receiving surface positioned adjacent the insulated base, and a heat exchange fluid conduit for circulating a heat exchange fluid in contact with the energy receiving surface. Other conduits are provided to introduce a heat exchange fluid and to receive or collect the fluid after it has been in contact with the energy receiving surface. The top or cover of the unit apparatus is a radiant energy transparent surface positioned in spaced relationship adjacent the energy receiving surface and is provided with a plurality of spaced raised structures having surfaces angularly disposed to transmit radiant solar energy to the energy receiving surface. Side walls provide a self-contained unit and permit mounting of the unit on a surface. The top or cover of the unit is constructed and arranged to provide a plurality of modular units having light transparent surfaces angularly disposed to collect and transmit the radiant energy to the energy receiving surface. The transparent surfaces are adjacently disposed to form a plurality of hollow structures each having a common base and wherein at least three transparent surfaces are provided having a common vertex. Preferably the structure is formed of four transparent surfaces wherein at least three surfaces have a common vertex. The invention also provides for a plurality of reflective surfaces angularly disposed to the base where a combination of transparent and reflective surfaces provide for optimum collection of radiant energy. The reflective surfaces are provided with at least one reflective surface angularly disposed to reflect incident radiant solar energy to an adjacent adsorptive surface. Where adsorption and reflective surfaces are employed to form the modular adsorption unit, the adsorption surfaces and reflective surfaces are adjacently disposed to form a plurality of structures having a common base and wherein at least three surfaces have a common apex. The structures preferably take the form of a hollow geometric pyramid having three or more sides. An important feature of this concept of the invention is that the surfaces forming the pyramidal shape can be varied in size as well as the angular relationship of the surfaces to each other and to the base of the cover containing the modular adsorption units. The shape of the surfaces is preferably flat, but may be curved in order to achieve maximum efficiency of collecting radiant solar energy. The invention provides an apparatus for collecting radiant solar energy regardless of the angle with respect to horizontal or or direction of the structure that it is positioned upon.

The invention accordingly comprises the apparatus possessing the construction, combination of elements and arrangement of parts which are exemplified in this disclosure and the scope and application of which will be indicated in the claims.

DESCRIPTION OF PREFERRED EMBODIMENTS

For a fuller understanding of the nature and desired objects of the invention, reference should be had to the following detailed description taken in connection with the accompanying drawing wherein like reference characters denote corresponding parts throughout the several views and wherein:

FIG. 5 is a fragmentary plan view of a modified energy receiving surface and insulation layer.

FIG. 6 illustrates an apparatus for attaching a collector module unit as illustrated in FIG. 5 to a roof structure.

FIG. 7 is a diagrammatic sectional view of a modified embodiment of the collecting module unit in accordance with the present invention.

FIG. 8 is a diagrammatic sectional view of a solar energy collector in accordance with the invention employing vacuum as insulation.

Figure 1:
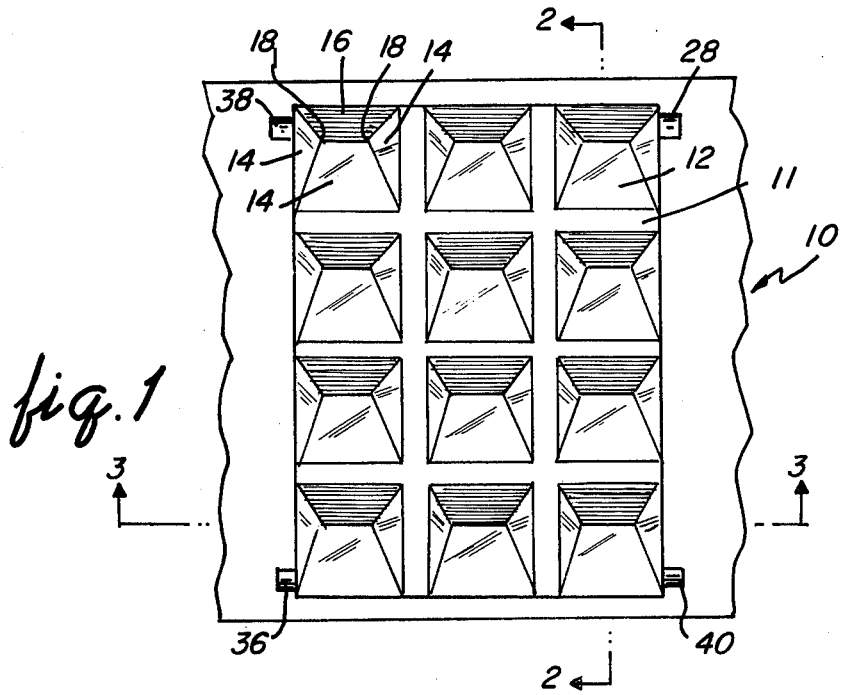
FIG. 1 is a top perspective view of an embodiment of the invention illustrating a solar energy collector module containing modular adsorption units as applied to a roof structure.
Figure 2:
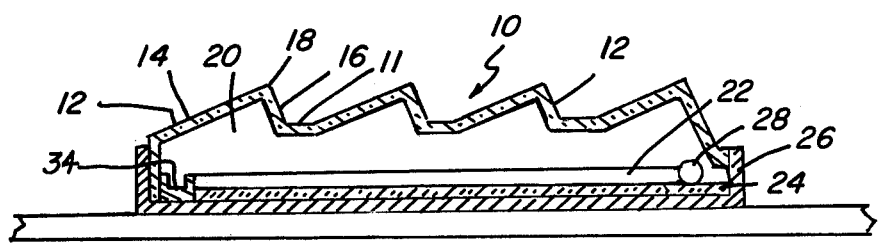
FIG. 2 is a sectional view taken through 2—2 of FIG. 1 and illustrating the internal assembly of the collector module.
Figure 3:
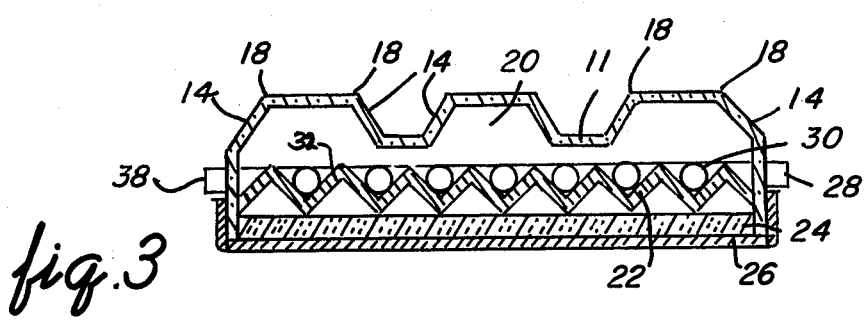
FIG. 3 is a sectional view taken through 3—3 of FIG. 1.

Referring now to FIGS. 1, 2, and 3 of the drawing, there is shown generally at 10 a collecting module of the present invention having cover 11 containing a plurality of modular units 12, each having three transparent surfaces 14 and one reflector surface 16. The module units 12 are shown in the shape of a pyramid with four sides having two apexes 18 and defining a space 20. The transparent surfaces 14 and reflector surfaces 16 are triangular in shape. As particularly illustrated in FIG.2 the transparent surfaces and the reflector surfaces are disposed at an angle to the energy receiving surface 22. The size of the angle for each surface 14 and 16 with respect to the energy receiving surface 22 can be varied as a function of the pitch of the surface to which the collecting module is attached and the direction of such surface to the radiant energy source. Energy receiving surface 22 also serves as the heat exchanger. Positioned adjacent the energy receiving surface is insulation layer 24 to prevent heat loss through the bottom of the assembly. The entire collector module assembly is contained by frame 26.

In the preferred embodiment the modular units 12 are formed of a plastic material, such as a clear acrylic plastic which will transmit radiant energy and minimize heat loss by conduction. Additionally, the plastic material is of a type that can be molded in sheet form to provide the modular units. Such molding operations are well known to those skilled in the art. In this manner the module units 12 are formed of one continuous integral structure.

In the preferred embodiment the reflector surfaces are provided by applying a reflective coating to the surfaces designated as reflective surfaces. Such reflective coating may be selected from the group consisting of reflective paints and reflective metallic coatings. Such metallic coatings can be applied, for example, by vacuum vapor deposition upon the modular cover units after such units have been properly masked, as is well known by those skilled in the art.

The energy receiving surface 22 is formed of a material which will absorb radiant energy or light energy and convert it to thermal or heat energy and transfer the thermal energy to a heat exchange fluid. In FIGS. 1 through 3 the energy receiving surface is a sheet of metal such as stainless steel, aluminum or copper corrugated to provide channels 32 through which the heat exchange fluid is passed. The upper surface is provided with a dull black coat to promote absorption of the solar radiant energy. The black coating can, for exmple, be provided by black paint or a layer of carbon black.

The insulation layer 24 is formed of a material such as styrofoam. Other materials such as fiberglass, wood, and asbestos can be used. The insulation layer serves to prevent heat loss or transfer from the bottom of the connecting module.

A heat exchange fluid such as a liquid, for example, is introduced to the collector unit by conduit 28 which is provided with a plurality of holes or openings 30 for distributing the heat exchange fluid over the energy receiving surface 22 via channels 32 whereby heat exchange occurs. The heated liquid is received and collected by conduit 34 and conducted by conduit 36 away from the collecting module to, for example, a suitable system where the thermal energy is removed and either stored and/or utilized while the heat exchange fluid is recirculated.

It is to be understood that where continued heating of the heat exchange fluid to higher temperatures is desired, the collecting units may be connected in series by suitable additional conduits 38 for introducing and 40 for receiving the heat exchange fluid whereby the heat exchange fluid is pumped sequentially from one collector to the next adjoining where the fluid is further heated. Additionally, whether the collecting units are connected in parallel arrangement or used singly the amount of heating of the fluid can be varied, for example, by varying the rate of flow of the fluid, the area of the heat exchange surfaace, the ratio of volume of fluid to area of heat exchange surface, and by periodically interrupting the fluid flow to allow the heat exchange surface to heat to a higher temperature.

Figure 4:
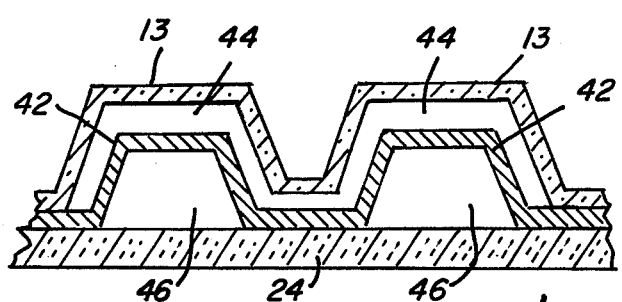
FIG. 4 is a fragmentary sectional view of a modified energy receiving surface within the scope of the invention.

Referring now to FIG. 4, there is illustrated a modified form of the energy receiving surface. In this embodiment of the invention the energy receiving surface 42 is constructed to conform to the shape or configuration of the modular units 13. This embodiment of the invention is particularly useful where the heat exchange fluid is a gas, such as air. The air or other suitable gas can be directed through spaces 44 and 46 in heat exchange relationship with energy receiving surface 42. Additionally, this embodiment of the invention provides for reduced heat loss through conduction by directing the heat exchange gas through space 46 only. Additionally, space 44 can be suitably vacuum sealed to provide further reduction of heat loss resulting by means of the vacuum insulation.

In FIGS. 5 and 6 there is illustrated a modified energy receiving surface and insulating layer and apparatus for attaching the collecting module to a roof structure. As shown a sheet 48 of metal, such as aluminum, is provided with a corrugated top 50 and a channel 52 to slidably receive track 54 which conforms to the configuration of the channel 52. The corrugated top surface 50 is provided with a black coating as previously described herein. The metal sheet 48 thus formed provides a container or mould which, when inverted, for example, can easily be filled with an insulation material 56 in particulate form, such as styrofoam, which can be bonded to itself and the inner surface of sheet 48 thus providing for easy fabrication. The upper surface 50 serves as the energy receiving surface and heat exchange surface as described with respect to FIGS. 1-3. The configuration of the corrugation can be varied, the main object being to control the flow of the heat exchange fluid and provide even distribution with maximum surface area to volume of fluid in contact with the surface. When provided with a cover or top and conduit system as described with respect to FIGS. 1-3 to provide a collecting module unit, the unit is easily attached to a roof structure (FIG. 6) by sliding it on to track 54 having a base plate 58 for attaching to a roof structure by screw fasteners 60.

Referring now to FIG. 7 of the drawing, there is shown a modified embodiment of collecting module unit in accordance with the present invention. As illustrated, a metal mould base 62 contains insulation 64. Positioned on the top surface 66 of the metal base mould 62 is the heat exchanger 68 comprising metal tubing through which a heat exchange fluid is circulated. Positioned above and in heat exchange relationship with heat exchanger 68 is the energy receiving surface 70 having a black upper surface to receive the radiant solar energy which is transmitted through the transparent cover 72. In this embodiment the base 62 and the energy receiving surface 70 can be formed of metals, such as aluminum, copper, tin, and alloys thereof. In an alternate form of this embodiment of the invention the energy receiving surface 70 is omitted. In this case the heat exchanger tubing 68 and surface 66 are provided with a black coat and serve as the energy receiving surface to transmit heat converted from the absorbed radiant energy to the heat exchange fluid.

Referring now to FIG. 7 there is shown an embodiment of the present invention in which insulation employed to reduce loss of heat due to conduction and convection is achieved by vacuum spaces. As shown, the space 74 between the cover 75 and the energy receiving surface 78 is evacuated and vacuum sealed to provide a vacuum in space 74. Similarly, the space 80 between the base 82 and the base support 84 for the tubular heat exchanger 86 is evacuated and sealed to provide a vacuum in space 80. A plurality of support elements 88 are provided to prevent the base 82 from being drawn by the vacuum toward the base support 84 of the heat exchanger 86.

It is to be understood that while the invention has been described with respect to preferred embodiments thereof, modifications may be made within the scope of the invention. For example, the modular adsorption units of a collecting module can be disposed and positioned in a staggered manner (not shown) as bricks are positioned with respect to each other. Additionally, the module units can be constructed and arranged to provide double layer (not shown) of the transparent and reflective surfaces thereby providing greater thermal insulation.

Also, in a less preferred embodiment, the shape or configuration of the modular units can be, for example, to provide square, rectangular, or dome-shaped modules.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A solar energy heat collector comprising an insulated base, a solar energy receiving means positioned adjacent said insulated base for absorbing radiant energy and converting said radiant energy to heat energy, means for circulating a heat exchange fluid in contact with said energy receiving means, means for introducing a heat exchange fluid to said circulating means, means for collecting said heat exchange fluid after contact with said energy receiving means and a cover means transparent to radiant solar energy positioned in spaced relationship to said energy receiving means, said cover means comprising a surface having a plurality of discrete spaced raised portions, each said spaced raised portions having at least three surfaces angularly disposed to said cover surface to transmit radiant solar energy to said energy receiving means.

2. The apparatus of claim 1 wherein the energy receiving means comprises an integral structure having a top surface and side surfaces, insulation means disposed within said top and side surfaces, said top surface comprising the energy receiving surface, said energy receiving surface having a plurality of channels extending from one end of said top surface to the opposite end to control the flow of said heat exchange fluid over said top surface and provide for exchange of heat from said energy receiving surface to said heat exchange fluid, and means for mounting said collector.

3. The apparatus of claim 2 wherein mounting means comprises channel means disposed along opposing side surface means and other means for attaching to a support, said other means having an elongated configuration to slidably receive said channel means.

4. The apparatus of claim 1 wherein said energy receiving means comprises a sheet of heat conducting material having an upper surface for converting radiant energy to heat energy.

5. The apparatus of claim 1 wherein said means for circulating a heat exchange fluid comprises a heat conducting conduit positioned in heat exchange relationship with said energy receiving means through which a heat exchange fluid is circulated.

6. The apparatus of claim 1 wherein said solar energy receiving means and said means for circulating a heat exchange fluid in contact with said energy receiving means comprises a heat conducting conduit having an outer energy receiving surface and defining a continuous closed passage for circulating a heat exchange fluid.

7. A solar energy heat collector comprising an insulated base, a solar energy receiving means positioned adjacent said insulated base for absorbing radiant energy and converting said radiant energy to heat energy, means for circulating a heat exchange fluid in contact with said energy receiving means, means for introducing a heat exchange fluid to said circulating means, means for collecting said heat exchange fluid after contact with said energy receiving means and a cover means transparent to radiant solar energy positioned in spaced relationship to said energy receiving means, said cover means having a plurality of spaced raised modular units, each of said modular units having radiant energy transparent means and reflective means, said transparent means being angularly disposed to said cover means to transmit radiant solar energy to said energy receiving means, said reflective means being angularly disposed to said cover means and the transparent means of an adjacent modular unit whereby radiant solar energy is reflected to the transparent means of said adjacent modular unit for transmission to said energy receiving means.

* * * * *